United States Patent [19]

Pollmeier et al.

[11] Patent Number: 5,698,908

[45] Date of Patent: Dec. 16, 1997

[54] BUFFERED DC POWER SUPPLY SYSTEM

[75] Inventors: Werner Pollmeier, Verl; Josef Schuck, Paderborn-Dahl; Ernst Weidner, Paderborn, all of Germany

[73] Assignee: Siemens Nixdorf Informationssysteme AG, Paderborn, Germany

[21] Appl. No.: 578,626

[22] PCT Filed: Jun. 21, 1994

[86] PCT No.: PCT/DE94/00703

§ 371 Date: Jan. 11, 1996

§ 102(e) Date: Jan. 11, 1996

[87] PCT Pub. No.: WO95/02914

PCT Pub. Date: Jan. 26, 1995

[30] Foreign Application Priority Data

Jul. 16, 1993 [DE] Germany ............. P 43 23 940.4

[51] Int. Cl.$^6$ ........................................ H02J 3/38
[52] U.S. Cl. ............... 307/44; 307/43; 307/71; 307/87; 307/141

[58] Field of Search ............... 307/43, 44, 46, 307/49, 64, 66, 71, 87, 141; 323/266

[56] References Cited

U.S. PATENT DOCUMENTS

| | | | |
|---|---|---|---|
| 3,599,071 | 8/1971 | Lapuyade et al. | 307/66 |
| 4,866,295 | 9/1989 | Leventis et al. | 307/43 |
| 4,890,003 | 12/1989 | Seibert et al. | 307/66 |
| 5,461,263 | 10/1995 | Helfrich | 307/64 |

*Primary Examiner*—William M. Shoop, Jr.
*Assistant Examiner*—Albert W. Paladini
*Attorney, Agent, or Firm*—Hill, Steadman & Simpson

[57] ABSTRACT

Power supply system having a buffered intermediate voltage which is supplied by an auxiliary voltage source in the event of failure of a principal voltage source, there being generated from the intermediate voltage by comparison with a threshold value a digital failure signal which both controls the auxiliary voltage source and is used to form a final failure signal.

17 Claims, 5 Drawing Sheets

BUFFERED DC POWER SUPPLY SYSTEM

BACKGROUND OF THE INVENTION

The method relates to a DC power supply system in which a principal power source is buffered by an auxiliary power source by providing that in the event of failure of the principal power source the auxiliary power source takes over the supply of energy.

In a known form of the buffered DC power supply, the mains voltage as the principal power source is rectified and, as an intermediate voltage, feeds a switching voltage transformer which supplies the final consumer. Via a further voltage transformer, the voltage of a battery is brought to a value near the lower limit of the intermediate voltage. The principal voltage and auxiliary voltage are decoupled by diodes and thus alternatively generate the intermediate voltage. Particularly in the case of data processing equipment, a digital signal is required which indicates whether the further power supply is ensured or whether the auxiliary voltage is exhausted after a mains failure. For this purpose, a watchdog module designed as a trigger compares the intermediate voltage with a reference voltage and thus generates a digital mains failure signal.

A disadvantage in this form of intermediate voltage generation is the large tolerance, required by the summation of tolerances, as explained in more detail in the description, of the input voltage for which the consumer of the intermediate voltage, that is to say the switching voltage transformer, must be designed. The latter must be configured for high voltages and, at the same time, for high currents in conjunction with low input voltages, in order to be able to provide the desired power at the output.

German reference DE 33 22 943 C2 demonstrates a power supply system in which an intermediate voltage is used. The rectified mains AC voltage serves as principal voltage source. The auxiliary voltage source is provided by a battery whose output voltage is transformed to the intermediate voltage by a DC-DC converter. A controller monitors the mains voltage and upon undershooting of a reference voltage switches on the DC-DC converter and thus connects the auxiliary voltage source to the intermediate voltage.

SUMMARY OF THE INVENTION

It is an object of the invention to provide a buffered intermediate voltage whose voltage range is not essentially wider than that of the voltage obtained from the mains voltage.

The invention achieves this object by providing that a controlable transformer is used for the auxiliary voltage source and that the control is performed independently of the value of the intermediate voltage.

In particular, the previously existing digital mains failure signal obtained from the intermediate voltage is used in order to switch on the auxiliary voltage. In this case, the auxiliary voltage is initially higher than the reference voltage which leads to the mains failure signal. The result of this is that the mains failure signal oscillates owing to feedback, that is to say there is a rapid succession of switching on and off which initially appears disadvantageous. However, this arrangement achieves the object simply by means of an interposed time-delay element. By means of a further integration element or time-delay element, it is then possible to generate the mains failure signal fed to the consumers, if the oscillating signal is missing for more than one cycle.

In another embodiment, use is made of the fact that the auxiliary voltage source is a DC-DC converter whose output voltage can be controlled by the mains failure controller. Here, as well, it is accepted that the original mains failure signal oscillates and that it is only through a timer that the mains failure signal to be relayed has to be formed. The analog controller switches on the auxiliary voltage at the start of the mains failure signal with a voltage situated above the reference voltage, as a result of which the mains failure signal is virtually immediately deactivated again. However, the controller keeps the auxiliary voltage switched on and rather makes use of the deactivated mains failure signal for the purpose of continuously reducing the output voltage of the auxiliary voltage source via a feedback-control voltage. As a result, the reference voltage is undershot again and the mains failure signal is reactivated. This change is used for the purpose of increasing the feedback-control voltage again, and thus of increasing the output voltage of the auxiliary voltage source again. The digital mains failure signal is thus integrated in an analog fashion and fed as control voltage to the auxiliary voltage source.

In an advantageous development, the intermediate voltage is additionally used in the controller in order likewise to accept the output voltage into the controlled system and thus to guide the intermediate voltage more accurately in a simple way.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
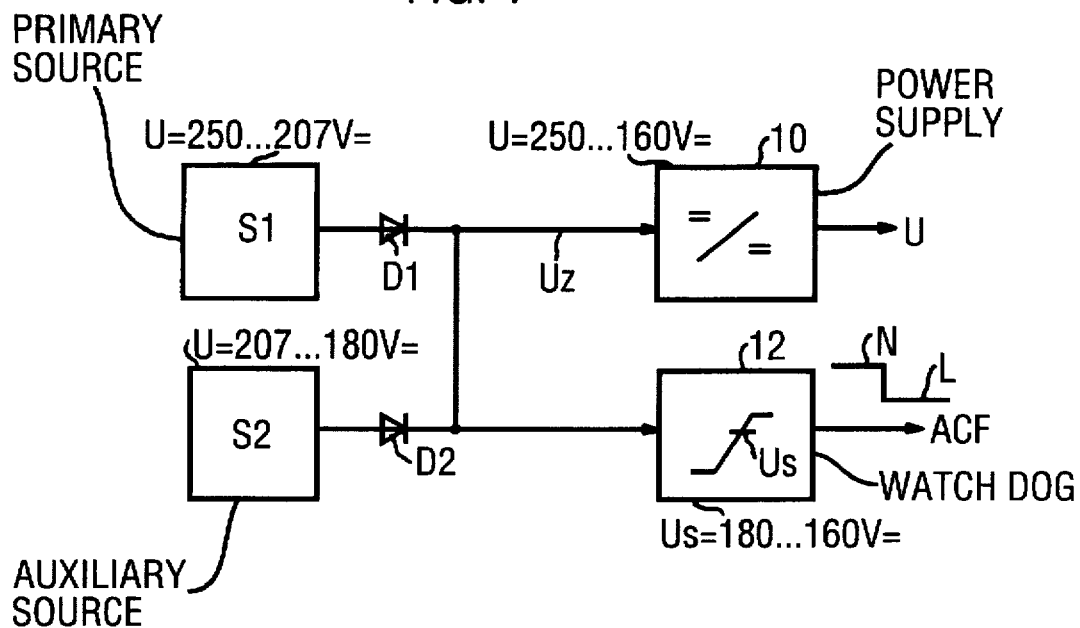
FIG. 1 shows a buffered DC power supply system according to the prior art which includes modules which are also used in the invention.

Represented in FIG. 1 are modules of a DC power supply system according to the prior art which are also used in an exemplary embodiment according to the invention. The DC power supply system represented in FIG. 1 has a switched-mode power supply unit 10 which operates in a known way as a DC-DC converter. The power supply unit generates a constant output voltage U. In normal operation, it is fed from a principal voltage source S1 via a coupling diode D1. Alternatively, feeding is provided from an auxiliary voltage source S2 via a coupling diode D2. The intermediate voltage Uz present at the input of the power supply unit 10 is compared with a threshold value Us by a watchdog module 12. If the intermediate voltage Uz is lower than the threshold value Us, the watchdog module 12 issues a digital signal ACF (Alternating Current Fail) with a low level L. This state occurs if neither of the two voltage sources can supply the power supply unit 10 with sufficient voltage and thus signals an imminent failure of the output voltage U. If the intermediate voltage Uz is higher than the threshold value Us, the watchdog module 12 issues a signal ACF with a high level H.

Such DC power supply systems are generally operated on the AC voltage network. The principal voltage source S1 is designed as a mains rectifier which in the case of a fluctuation in the AC voltage by ±10% and a nominal value of 230 V has a DC voltage range of 207 V to approximately 250 V. So that in normal operation the auxiliary voltage source S2, which is generally fed from a battery, is not prematurely discharged, its voltage range adjoins that of the principal voltage source S1 as far as possible with only a slight overlap. In the case of a conventional relative voltage fluctuation of the second DC voltage source of ±5%, the nominal voltage is selected as 198 V with a range of 180 V to 207 V. So that the watchdog module 12 does not activate the signal ACF until undershooting of the operating voltage range of the auxiliary voltage source S2, the threshold value Us thereof is to be selected such that it is always below the lowest voltage of the auxiliary voltage source S2. This means that the threshold value Us must always be less than 180 V. Since the watchdog module 12 and the threshold value are also subject to a tolerance, for example ±5% together, 170 V is to be assumed as the nominal value with a fluctuation range of 160 V to 180 V.

In accordance with the quasi-operational example represented, the power supply unit must be designed such that it reliably processes an input voltage range of 160 V to 250 V. Since the power to be supplied remains the same, the power supply unit must be designed both for a high voltage at 250 V and for a high current at 160 V. Again, the losses rise with a particularly wide input range.

Figure 2:
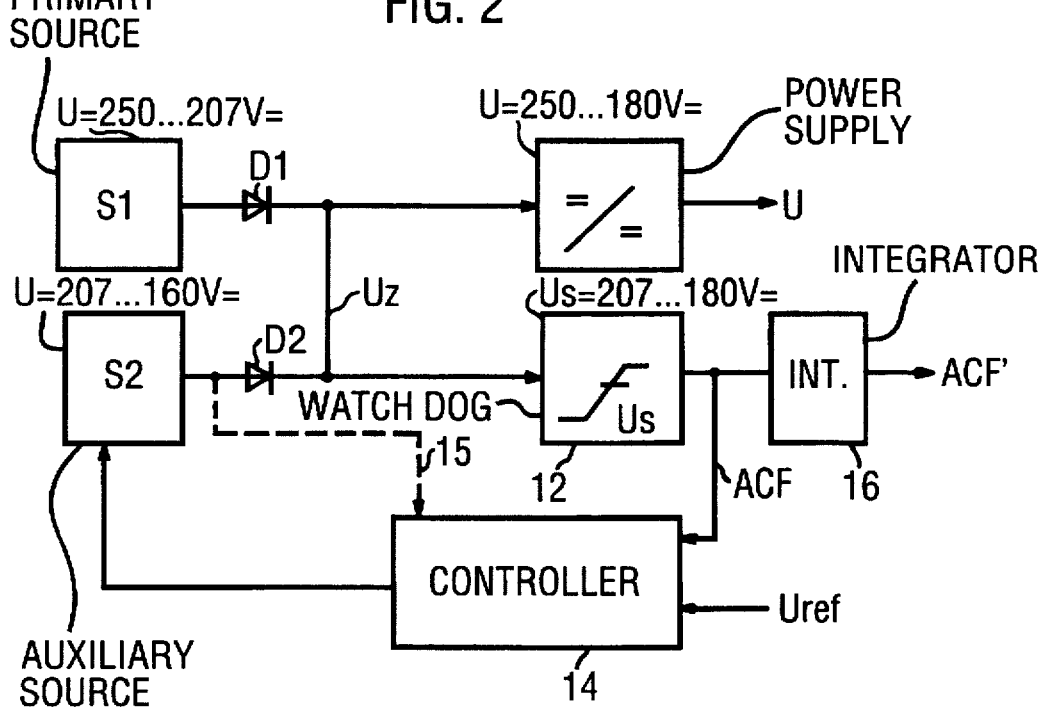
FIG. 2 shows a schematic block diagram of an exemplary embodiment according to the invention.

In the exemplary embodiment of the invention represented in FIG. 2, the input voltage range of the power supply unit 10 is reduced for the same operating voltage range of the principal voltage source S1 and the auxiliary voltage source S2. As is to be seen, the DC power supply system according to FIG. 2 has a structure which is similar to the example according to FIG. 1 but with the difference that the signal ACF is fed to a controller 14 which sets the output voltage Ua of the auxiliary voltage source S2. In this case, use is made of an auxiliary voltage source with a controlable output voltage such as obtains, for example, when the DC voltage of a battery is stepped up by a DC-DC converter. Furthermore, the threshold value Us is stepped up to a higher value of nominal 198 V in the case of a tolerance band of 180 V to 207 V.

If the voltage of the principal voltage source S1 undershoots the threshold value Us, the signal ACF is activated by switching from H to L. The controller 14 now causes the auxiliary voltage source S2 to be activated. Upon activation, that is to say at the start of feeding by the auxiliary voltage source S2, its output voltage Ua has a value above the threshold value Us. This means that the signal ACF changes back into the inactive state, that is to say from L to H. This change is at first not taken into account by the controller; however, the controller 14 adjusts the output voltage Ua to a value near the threshold value Us which is fed to the controller 14 as desired value in the form of a reference voltage Uref. The actual value is fed via the signal path 15. This signal path 15 and the reference voltage are optional, which is indicated in FIG. 2 by a dashed line and is explained further below. The reference voltage Uref is preferably equal to the threshold value voltage or is derived by a voltage divider.

In the exemplary embodiment according to FIG. 2, the watchdog module 12 is part of a control loop for controling the output voltage Ua of the auxiliary voltage source S2. Its threshold value Us can now be set to a higher value (nominal 198 V). This value is inside the operating voltage range of the auxiliary voltage source S2. This means that the input voltage range of the power supply unit 10 is reduced, in the example represented to a value of 180 V to 250 V DC voltage. As shown by a direct comparison with the input voltage range of the exemplary embodiment according to the prior art (FIG. 1), in the invention the critical lower voltage value has been substantially increased, which leads to a substantially reduced maximum in the heat power loss which occurs and to a reduced maximum loading of the switching transistor of the power supply unit 10.

In the exemplary embodiment according to FIG. 2, the signal ACF is fed to an integrator module 16, which generates a signal ACF' with a low level L only when the corresponding signal ACF is present for a prescribed time. The integrator module 16 can also be realised by a retriggerable, monostable flip-flop with adjustable time delay.

Figure 3:
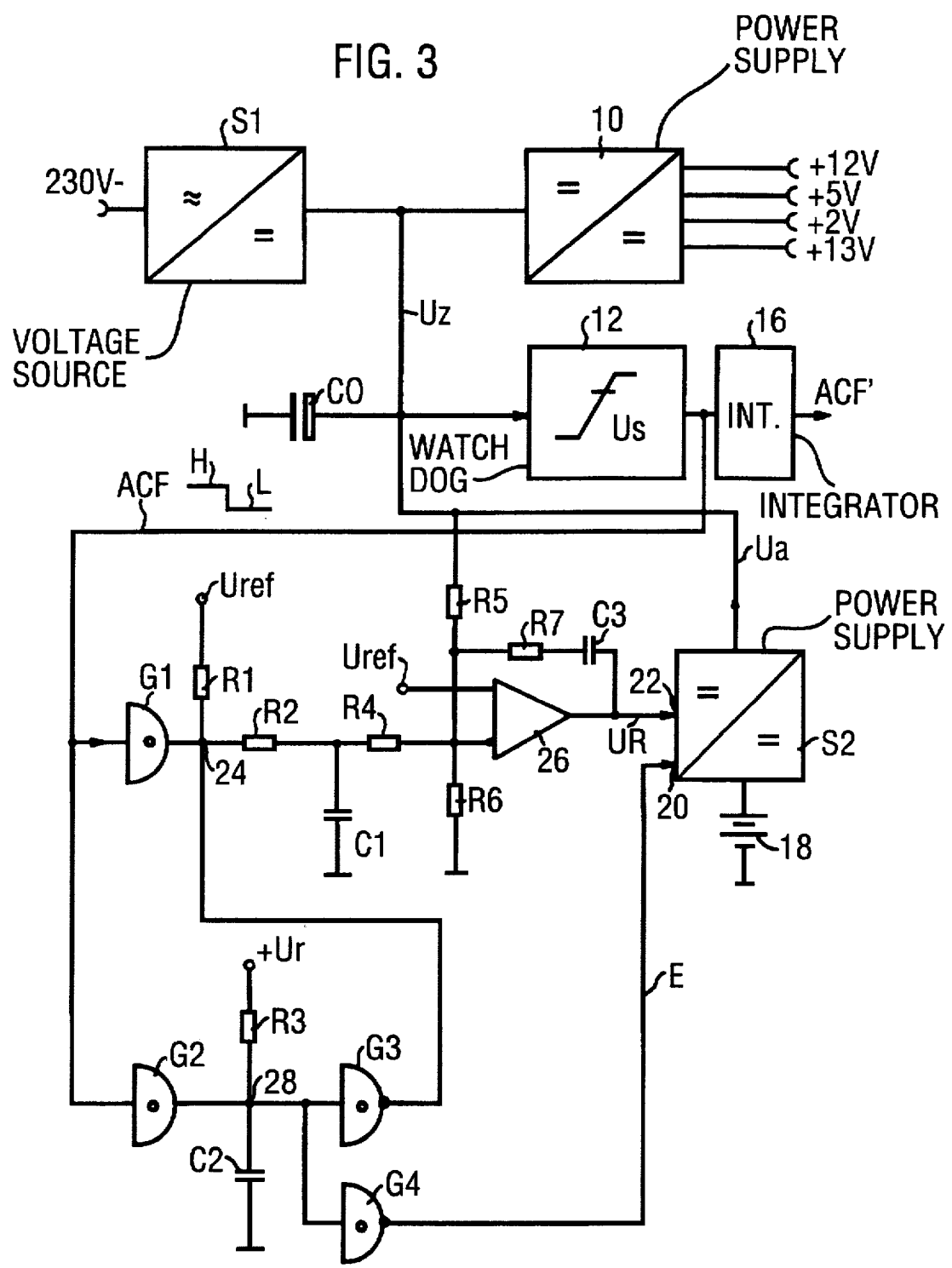
FIG. 3 shows a block diagram of a DC power supply system in which different subassemblies are realized by discrete components.

The DC power supply system according to FIG. 2 is represented in FIG. 3 with further technical details, it being the case, in particular, that the controller 14 is represented by individual components. In FIG. 3, the principal voltage source S1 is connected to the AC mains of 230 V. The principle voltage source S1 is realized by a mains rectifier. The output voltage of the principal voltage source S1 is smoothed by a capacitor C0 and is fed to the switched-mode power supply unit 10, which operates as a DC-DC converter. Also applied to the input of the power supply unit 10 is the output voltage Ua of the auxiliary voltage source S2, which is likewise designed as a controlled DC-DC converter. The auxiliary voltage source S2 is fed from a battery 18. The intermediate voltage Uz is produced by the interconnection of the principal voltage source S1 and the auxiliary voltage source S2. Since the principal voltage source S1 essentially comprises rectifier diodes, the diode D1 of FIG. 2 is not required. Again, the function of the diode D2 is taken over by the conventional rectifier circuit at the output of the auxiliary voltage source S2 thus designed.

The auxiliary voltage source S2 has two control inputs 20, 22. A signal E by means of which the auxiliary voltage source S2 can be switched on and off is fed to the control input 20. A feedback-control voltage Ur by means of which the output voltage Ua is controlled is fed to the control input 22.

The output signal ACF of the watchdog module 12 is fed to a gate G1. This gate G1 and the gates still to be described below are of the type having an open collector or having an open output. The signal of the gate G1 is fed to an intermediate tap 24 of a voltage divider which is formed from resistors R1, R2 and to which the capacitor C1 is connected downstream in series to earth. The resistor R1 is connected to a reference voltage source Uref. The components G1, R1, R2, C1 form an integrator module having an integration time T11. The voltage across the capacitor C1 is fed via a resistor R4 to a centre tap of a voltage divider formed from the resistors R5, R6, and to the inverting input of an amplifier 26. The amplifier 26 generates the voltage Ur which is fed to the control input 22 and is fed back via the capacitor C3 and the resistor R7 to the inverted input. The amplifier 26 operates as a PI controller.

The resistor R5 is connected to the intermediate voltage Uz, at the same time the output voltage Ua. The resistors R5 and R6 thus form an actual-value voltage divider. The reference voltage Uref is connected to the non inverting input of the amplifier 26. The reference voltage is selected such that in normal operation the output voltage Ua of the auxiliary voltage source S2 is just above or below the threshold value Us in the switched-on state. The reference voltage is preferably (not shown) generated from the voltage determining the threshold value Us by means of a voltage divider.

The signal ACF is, furthermore, fed to a gate G2 whose output signal is connected to a centre tap 28 of a timer formed from a resistor R3 and a capacitor C2. The resistor R3 is fed from the supply voltage Uv of the controller. The inputs of the gates G3, G4, having an inverted output, are connected to the centre tap 28. The output signal of the gate G3 is led to the intermediate tap 24. The gate G4 generates the abovementioned output signal E for the purpose of switching the auxiliary voltage source S2 on and off.

The mode of operation of the DC power supply system represented in FIG. 3 is explained below in three operating phases. The operating phase i is characterized in that the principal voltage source S1 operates satisfactorily. This means that the output voltage Ua is higher than the threshold value Us and the signal ACF generated by the watchdog module 12 is permanently at level H. The open collector output of the gate G1 is then blocked. The capacitor C1 could be charged to a positive voltage via the voltage divider with the resistors R1, R2, but this is prevented by the gate G3 with a low level L, since the gate G2 blocks and consequently a positive voltage is present at the point 28. In this way, the initial value of the integrator stage is set by means of the capacitor C1 for the following operating phase. The gate G4 generates at its output a signal E with level L. At this level, the auxiliary voltage source S2 is switched off.

As already mentioned, the signal level L at the intermediate tap 24 prevents charging of the capacitor C1. The low voltage value of the latter also lowers the part voltage across the resistor R6 of the actual-value voltage divider formed by the resistors R5, R6. A low actual value of the output voltage Ua is thereby simulated. Consequently, the amplifier 26 increases the feedback-control voltage Ur in order to compensate a drop in the actual value at its input. When the auxiliary voltage source S2 is switched on, it will therefore set a high output voltage Ua because of the excessive feedback-control voltage Ur.

The operating phase 2 begins after a drop in the voltage output by the principal voltage source S1, for example owing to mains failure. The intermediate voltage Uz undershoots the threshold value Us, with the result that the watchdog module 12 generates a signal ACF with level L. The conducting gate G2 discharges the capacitor C2, whereupon the gates G3 and G4 block. The signal E of the gate G4 changes its level from L to H, as a result of which the DC voltage source S2 is switched on. The likewise conducting gate G1 keeps the point 24 at a low potential.

Since a high feedback-control voltage Ur is present at the control input 22, at the start of feeding from the auxiliary voltage source S2 the output voltage Ua thereof is set to a value substantially above the threshold value Us. Thereafter, the watchdog module 12 switches the signal ACF to level H again, with the result that the gates G1 and G2 are deactivated and their outputs, the intermediate taps 24 and 28, are no longer kept at low potential. The capacitor C2 at the intermediate tap 28 (output of gate G2) is slowly charged via the resistor R3, but initially preserves a low potential, with the result that the gate G3 remains deactivated and, via G4, the auxiliary voltage source S2 remains activated. Consequently, an H level is present at the intermediate tap 24 and the integrator module formed from the components R1, R2, C1 is isolated. The capacitor C1 is thus charged via the resistors R1, R2; its voltage rises. The effect of this is that the amplifier 26 sets the feedback-control voltage Ur to a lower value, whereupon the output voltage Ua is reduced. When the output voltage Ua becomes lower than the threshold value Us, the watchdog module 12 switches its signal ACF to level L again. The gate G1 switches the intermediate tap 24 to low potential and discharges the capacitor C1, as a result of which the feedback-control voltage Ur and thus the output voltage Ua are increased. A regular repetition of H and L levels of the signal ACF is produced; this signal oscillates. This represents a feedback-control process.

The timer formed by the resistor R3 and the capacitor C2 is dimensioned such that during the feedback-control process the gates G3, G4 always remain in the blocked state, that is to say the time constant of this timer is selected to be greater than the time within which the signal ACF is respectively at the level H during the feedback-control process. A small hysteresis in the watchdog module 12 during the generation of the signal ACF ensures steep voltage edges during switching over the levels and assists the feedback-control process.

The operating phase 3 is characterized by return of the normal output voltage Ua at the principal voltage source S1, as a result of which the intermediate voltage Uz is permanently higher than the reference voltage Us. The signal ACF then has the H level, whereupon the gates G1 and G2 block independently of the feedback-control process which has been running so far. The capacitor C2 can be charged to positive voltage. When the gate threshold values are reached, the gates G3 and G4 switch to the L level at their respective outputs. In the case of the output signal E, this level has the effect that the auxiliary voltage source S2 is switched off. The capacitor C1 is discharged via the gate G3. The operating phase 1 is thus reached again. The operating phase 2 begins anew when the voltage of the principal voltage source S1 drops below the threshold value Us.

If, during the operating phase 2, the battery 18 is exhausted, the output voltage Ua remains below the threshold value Us despite a high feedback-control voltage. As a result, the signal ACF remains at the L level, and the final failure signal ACF' is activated via the pulse shaper 16 which, as described, is designed, for example, as an integrator or retriggable flip-flop.

In the case of a variant of the DC power supply system represented in FIG. 3, the amplifier 26 is eliminated, as are the resistors R4, R5, R6 and R7 as well as the capacitor C3 and the reference voltage Uref. The resistor R1 is connected to a prescribed voltage, preferably provided by the auxiliary voltage source S2. The voltage across the capacitor is used directly as the feedback-control voltage Ur. In this case, the auxiliary voltage source S2 is designed such that given a zero voltage at the input 22 the output voltage Ua is above the threshold voltage Us and, when the supply voltage is present at the resistor R1, is at the lower value of the input voltage determined for the switching voltage converter 10.

A further variant of the DC power supply system represented in FIG. 3 can consist in influencing not the actual value of the output voltage Ua via the actual-value voltage divider with the resistors R5, R6, but the reference voltage Uref fed to the amplifier 26 at the noninverted input as desired value. This reference voltage must then be selected such that it is increased at the start of feeding from the auxiliary voltage source S2.

Figure 7:
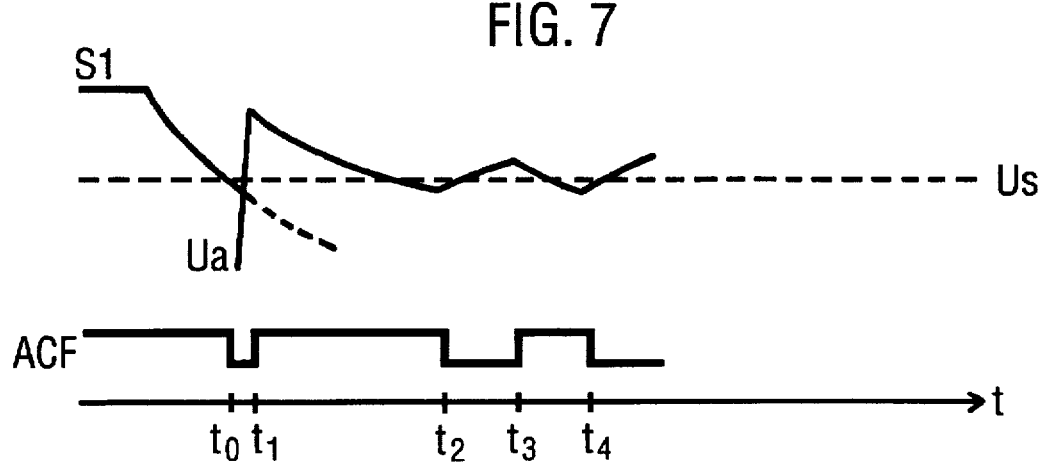
FIG. 7 shows an idealized characteristic of the output voltage of the auxiliary voltage source, plotted over time together with the digital failure signal.

The signal characteristics of the described processes during the transition from the operating phase 1 to the operating phase 2 are represented in FIG. 7 in an idealized manner as a function of time. At the instant t0, the voltage provided by the principal voltage source S1 has dropped below the threshold value Us, with the result that the signal ACF goes to the L level. Consequently, the auxiliary voltage source S2 is switched on and takes over feeding. At the instant t1, the threshold voltage Us is once again overshot, and the signal ACF goes to the H level again; however, the auxiliary voltage source S2 remains switched on. Its voltage is, however, reduced by the integrator, until the threshold voltage Us is once again undershot at instant t2, and the signal ACF goes to the L level once again. A renewed rise is thus effected.

Figure 4:
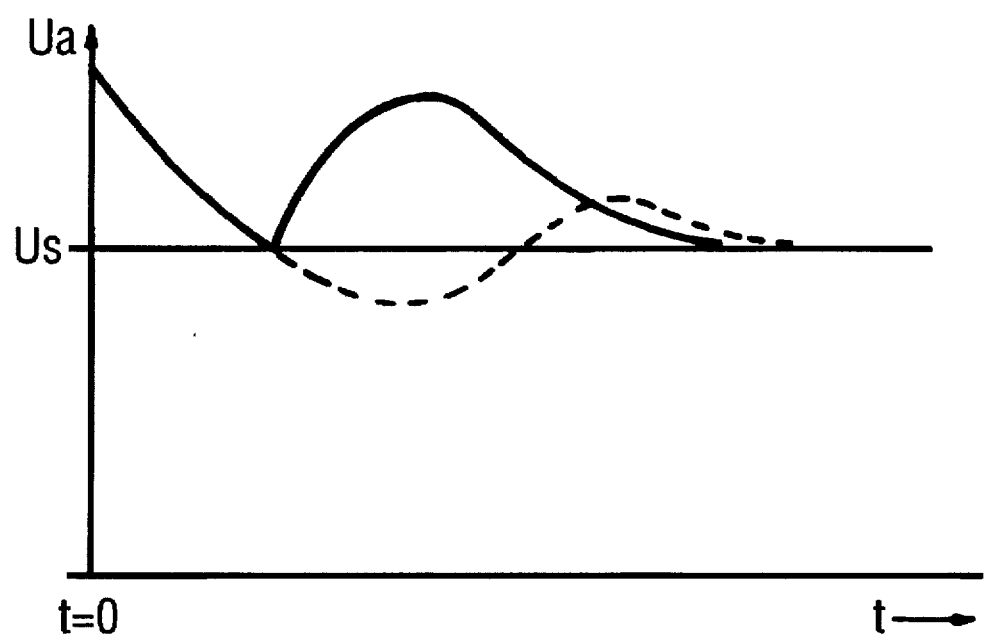
FIG. 4 shows a characteristic, represented over time, of the output voltage of the second DC voltage source.

FIG. 4 shows the behaviour of the output voltage Ua in relation to the threshold value Us over time t. The characteristic drawn in by dashes shows a feedback-control response for which the output voltage Ua fluctuates about the threshold value Us at the start of feeding from the auxiliary voltage source S2.

In a further variant of the circuit arrangement shown in FIG. 3, the integrator formed by the components G1, R1, R2, C1 is eliminated, as is the gate G3. This variant is sketched in FIG. 5. In the case of a change in the signal ACF from level H to level L, the signal E generated by the gate G4 switches without delay to level H, and thus switches on the auxiliary voltage source S2. If, when the output voltage Ua overshoots the threshold value Us, the signal ACF changes from level L to level H, the signal E changes its level from H to L by means of the timer R3 and C2 with a time delay since, as described, gate G2 has an open collector output and the capacitor is charged only via the resistor R3.

Figure 5:
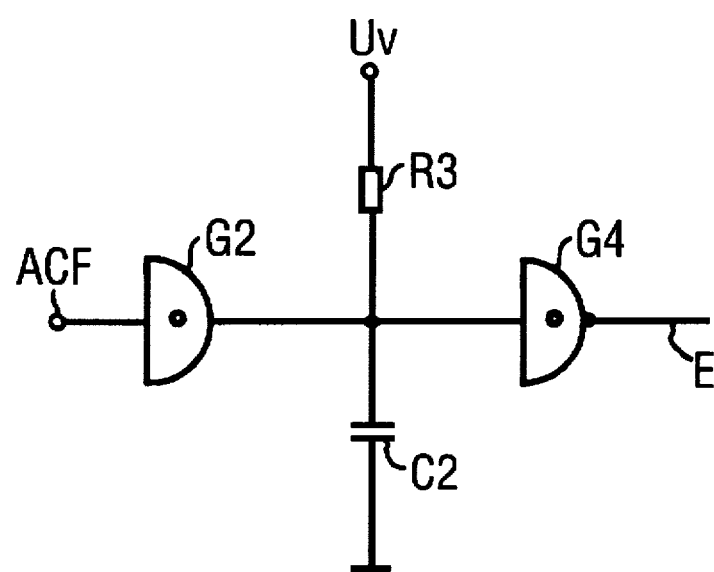
FIG. 5 shows a further exemplary embodiment of the invention having a simplified circuit arrangement for controling the output voltage.
Figure 6:
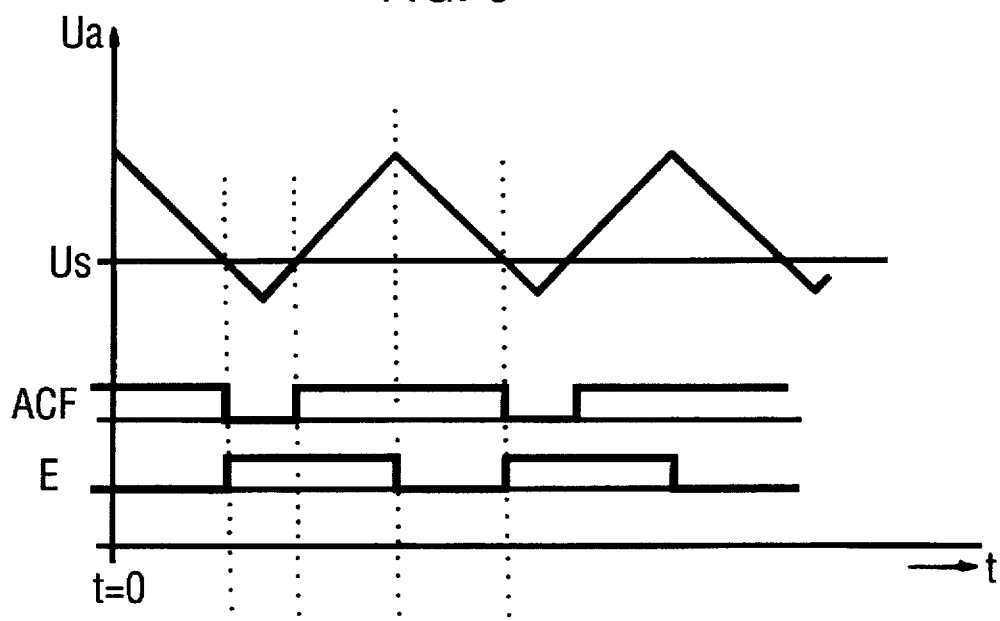
FIG. 6 shows a characteristic of the output voltage of the auxiliary voltage source with a value fluctuating about the threshold value as plotted against time, and the two digital control signals.

FIG. 6 represents the feedback-control response of the DC power supply system over time in the case of the circuit variant according to FIG. 5. The output voltage Ua of the second DC voltage source oscillates linearly about the threshold value Us in the manner of a sawtooth. The variation period Ts is a function of the time constants of the auxiliary voltage source S2, of the timer R3 and C2 and of the capacitor C0. The signals ACF and E are likewise drawn in. It is to be seen that switching off is delayed by comparison with the change in the signal ACF from L to H.

Since the high peak value of the output voltage Ua is a function of the delay, an influence can be exerted by coupling the intermediate voltage to the timer. For example, the supply voltage of the resistor R3 can be connected to the intermediate voltage Uz. Shaping can be performed in this case by means of filters or else amplifiers. In the case of a rising intermediate voltage Uz, the capacitor will then charge more rapidly and thus counteract a rise in the intermediate voltage Uz. There is a coupling of the intermediate voltage Uz to the timer, by means of which the delay time of the timer is controlled. Again, a delay in switching on is possible in order to lengthen the cycle times. In this process, the repeated switching off of the auxiliary voltage source S2 is used to determine at regular intervals whether the principal voltage source S1 can once again take over the supply.

For the case in which the desired delay is already included in the design of the auxiliary voltage source S2, the controller 14 can be replaced by a simple connection which connects the digital failure signal ACF directly to a switching input of the auxiliary voltage source S2.

Figure 8:
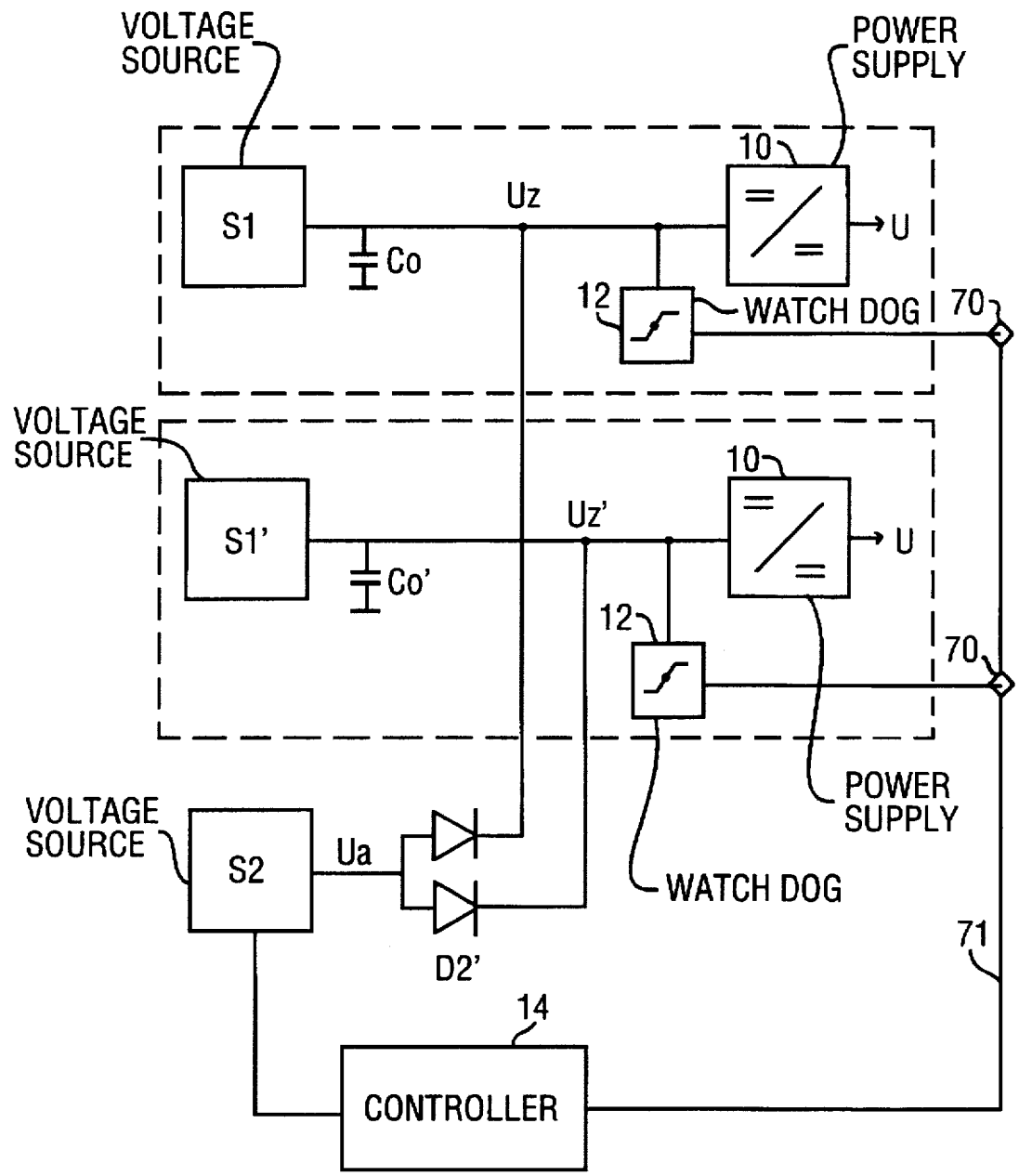
FIG. 8 shows a DC power supply system having a plurality of principal voltage sources and one auxiliary voltage source.

The invention can also be used in the case of DC power supply systems having a plurality of DC voltage power supply units of the type of the power supply unit 10, one auxiliary voltage source S2 being used for a plurality of principal voltage sources. This arrangement is represented in FIG. 8 for the simplest case of two principal voltage sources; an extension to three or more is possible straight away. In this arrangement, a principal voltage source S1, an assigned filter capacitor C0, a DC-DC converter 10 as consumer and a watchdog module 12 are present and form a first subsystem, which is shown in a dashed box. One or more similar subsystems having the principal voltage source S1', the filter capacitor C0', the DC-DC voltage converter 10' and the watchdog module 12' are additionally present. A common auxiliary voltage source S2 having the output voltage Ua is guided via diodes D2, D2' to the respective intermediate voltages Uz, Uz'. The outputs of the watchdog circuit 12, 12' are combined by an OR operation 70, 70' and fed to the controller 14. If, for example, the principal voltage sources S1 and S1' are connected to different phases of a three-phase mains, in the event of failure of one phase the auxiliary voltage source S2 takes over the supply of the corresponding subsystem in conjunction with a simple circuit design. The same holds for a failure of the rectifier devices in one of the principal voltage sources. By means of appropriate dimensioning, the auxiliary voltage source S2 takes over the supply even in the case of complete failure of both principal voltage sources.

The auxiliary voltage source S2 can also be fitted with only one analog input, which is switched rapidly to a high feedback-control voltage by the controller at the start of feeding. This can, for example, be performed (not represented) by connecting the output of the amplifier 26 to the control input 22 of the auxiliary voltage source S2 via a resistor, by using a non-inverting type as the gate G4, and by using the output of this gate in order to shortcircuit the feedback-control voltage.

The tolerance band of the intermediate voltage can be still further narrowed by means of the invention. In this case, use is made of the fact that the tolerance of the mains voltage (for example 20%) is usually greater than the tolerance of the auxiliary voltage source S2 (for example 10%) and the tolerance of the watchdog module (for example 5%) is smaller again. In this case, the threshold value is then designed such that the interval of the watchdog module is terminated at the lower value with the interval of the principal voltage source S1, and this also applies to the auxiliary voltage source S2. In this case, it is accepted that the auxiliary voltage source S2 is already activated prematurely in unfavorable combinations. However, the effect of the intermittent mode of operation of the invention is that the auxiliary voltage source S2 is loaded less than in accordance with the prior art, in which the auxiliary voltage source S2 would then take over the supply entirely.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A power supply system having a buffered intermediate voltage, comprising:

a principal voltage source having a prescribed first output voltage range connected in parallel to an auxiliary voltage source having a prescribed second output voltage range, the first and second voltage ranges only slightly overlapping and the first voltage range being higher than the second voltage range;

a voltage at the connection of the two voltage sources being an intermediate voltage, which is fed to a consumer;

a digital failure signal formed by comparing the intermediate voltage with a predetermined reference voltage, which is inside the second voltage range;

an occurrence of the digital failure signal causing the output voltage of the auxiliary voltage source to rise above the reference voltage and elimination of the failure signal causes a drop in the output voltage of the auxiliary voltage source below the reference voltage; and a final failure signal that is activated if the digital failure signal is activated for a prescribed minimum time.

2. The power supply system as claimed in claim 1, wherein the auxiliary voltage source has a digital switching input that receives the digital failure signal via a controller which brings said signal into phase and delays leading and trailing edge of said signal.

3. The power supply system as claimed in claim 2, in which the controller is additionally connected to the intermediate voltage and the intermediate voltage delay times for said edges of said signal.

4. The power supply system as claimed in claim 1, wherein the auxiliary voltage source has an analog control input which receives via a controller the digital failure signal, and wherein the controller has an integrator circuit for the digital failure signal, which acts on an analog control input of the auxiliary voltage source.

5. The power supply system as claimed in claim 4, wherein the controller is connected to the intermediate voltage and controls the output voltage of the auxiliary voltage source into a vicinity of the reference voltage via the analog control input.

6. The power supply system as claimed in claim 3, wherein in addition to the analog control input the auxiliary voltage source has a digital switching input which is activated by the digital failure signal through a pulse shaper stage in the controller.

7. The power supply system as claimed in claim 1, wherein the digital failure signal is received by a pulse stage whose output is a final failure signal, the final failure signal being activated when the digital failure signal is active for a prescribed minimum time.

8. The power supply system as claimed in claim 1, wherein the principal voltage source is a rectifier circuit connected to an AC supply network, and wherein the auxiliary voltage source is a DC-DC voltage converter fed from a battery.

9. The power supply system as claimed in claim 1, wherein the intermediate voltage is connected to a controlled switching voltage transformer.

10. The power supply system as claimed in claim 1, wherein a plurality of power supply systems are employed, the power supply systems having separate principal voltage sources and watchdog modules as well as a common auxiliary voltage source, in which digital failure signals of the watchdog modules are connected to an OR circuit whose output controls the auxiliary voltage source.

11. A power supply system having a buffered intermediate voltage, comprising:

a principal voltage source having a prescribed first output voltage range connected in parallel to an auxiliary voltage source having a prescribed second output voltage range, the first and second voltage ranges only slightly overlapping and the first voltage range being higher than the second voltage range;

a voltage at the connection of the two voltage sources being an intermediate voltage, which is fed to a consumer;

a digital failure signal formed by comparing the intermediate voltage with a predetermined reference voltage, which is inside the second voltage range;

an occurrence of the digital failure signal causing the output voltage of the auxiliary voltage source to rise above the reference voltage and elimination of the failure signal causes a drop in the output voltage of the auxiliary voltage source below the reference voltage; and a final failure signal that is activated if the digital failure signal is activated for a prescribed minimum time; and the auxiliary voltage source having an analog control input which receives via a controller the digital failure signal, the control having an integrator circuit for the digital failure signal, which acts on an analog control input of the auxiliary voltage.

12. The power supply system as claimed in claim 11, wherein the controller is connected to the intermediate voltage and controls the output voltage of the auxiliary voltage source into a vicinity of the reference voltage via the analog control input.

13. The power supply system as claimed in claim 11, wherein in addition to the analog control input the auxiliary voltage source has a digital switching input which is activated by the digital failure signal through a pulse shaper stage in the controller.

14. The power supply system as claimed in claim 11, wherein the digital failure signal is received by a pulse stage whose output is a final failure signal, the final failure signal being activated when the digital failure signal is active for a prescribed minimum time.

15. The power supply system as claimed in claim 11, wherein the principal voltage source is a rectifier circuit connected to an AC supply network, and wherein the auxiliary voltage source is a DC-DC voltage converter fed from a battery.

16. The power supply system as claimed in claim 11, wherein the intermediate voltage is connected to a controlled switching voltage transformer.

17. The power supply system as claimed in claim 11, wherein a plurality of power supply systems are employed, the power supply systems having separate principal voltage sources and watchdog modules as well as a common auxiliary voltage source, in which digital failure signals of the watchdog modules are connected to an OR circuit whose output controls the auxiliary voltage source.

* * * * *